United States Patent [19]

Tang

[11] Patent Number: 5,589,215
[45] Date of Patent: Dec. 31, 1996

[54] METHOD OF MAKING AND USING A FAT MIMETIC IN REDUCED FAT/CHOLESTEROL FOODSTUFFS

[75] Inventor: Pamela S. Tang, Palatine, Ill.

[73] Assignee: Griffith Laboratories Worldwide, Inc., Alsip, Ill.

[21] Appl. No.: 128,602

[22] Filed: Sep. 29, 1993

[51] Int. Cl.$^6$ .............................. A21D 2/00; A23L 1/0522
[52] U.S. Cl. .............................. 426/549; 426/578; 426/804
[58] Field of Search .............................. 426/549, 496, 426/578, 554, 555, 637, 804

[56] References Cited

U.S. PATENT DOCUMENTS

| | | |
|---|---|---|
| 3,468,673 | 9/1969 | Keller ................................ 426/637 |
| 4,103,037 | 7/1978 | Bodor et al. . |
| 4,308,294 | 12/1981 | Rispoli et al. . |
| 4,510,166 | 4/1985 | Lenchin et al. . |
| 4,591,507 | 5/1986 | Bodor et al. . |
| 4,911,946 | 3/1990 | Singer et al. . |
| 4,956,193 | 9/1990 | Cain et al. . |
| 4,991,709 | 1/1991 | Furcsik et al. . |
| 5,080,921 | 1/1992 | Reimer . |
| 5,094,872 | 3/1992 | Furcsik et al. . |
| 5,098,728 | 3/1992 | Singer et al. . |
| 5,133,984 | 7/1992 | Murphy et al. ................... 426/556 |
| 5,137,742 | 8/1992 | Bakal et al. . |
| 5,153,020 | 10/1992 | Singer et al. . |
| 5,209,942 | 5/1993 | Bauer et al. . |
| 5,262,187 | 11/1993 | Hahn .................................. 426/554 |

FOREIGN PATENT DOCUMENTS 2205849  12/1988  United Kingdom .

OTHER PUBLICATIONS

Watt, Bernice and Merrill, Annabel 1975 Composition of Foods USDA Washington DC p. 106.
Whestler 1984 Starch Chemistry & Technology Second Edition New York pp. 481–482.

*Primary Examiner*—Carolyn Paden
*Attorney, Agent, or Firm*—Laff, Whitesel, Conte & Saret, Ltd.

[57] ABSTRACT

A fat mimetic system using a unique combination of starch, cellulose and protein as well as optional gum and flavoring.

23 Claims, No Drawings

METHOD OF MAKING AND USING A FAT MIMETIC IN REDUCED FAT/CHOLESTEROL FOODSTUFFS

BACKGROUND OF THE INVENTION

This invention relates generally to methods of making and using fat mimetics. More particularly, this invention relates to a fat mimetic system for replacing saturated and unsaturated fat as well as cholesterol in a wide range of prepared foodstuffs which maintains the flavor and other organoleptic properties of their full-fat counterparts.

Consumer awareness of the health benefits of reduced fat and reduced cholesterol content foods is bringing about increasing demands for foods with reduced fat and cholesterol content. The food industry has sought to meet these demands by replacing at least a portion of the fat in prepared foodstuffs. Unfortunately, many prior attempts to do so have produced foodstuffs with off-flavors and unnatural and undesirable appearance and mouthfeel.

Accordingly, it is an important object of the present invention to provide a fat mimetic system which can be used in prepared foodstuffs to achieve reduced saturated and unsaturated fat and cholesterol while maintaining the same flavor and other organoleptic properties as their full-fat counterparts. For purposes of this invention, "prepared foodstuffs" are intended to include foods having more than about three grams of fat per serving which, in their preparation, include the addition of fat. Examples of such "prepared foodstuffs" includes soup, sauce, gravy, salad dressing, icings and bakery fillings, mayonnaise, ice-cream, cheese, baked goods like biscuits, cakes and cookies and processed meats such as hot dogs and sausage.

It is a further object of the present invention to provide a fat mimetic system for prepared foodstuffs in which the saturated fat component of the prepared foodstuffs can be preferentially reduced, thereby producing prepared foodstuffs with fat primarily of the unsaturated type.

It is yet another object of the present invention to provide a fat mimetic for use in prepared foodstuffs which is particularly economical and easy to use.

The above and other objects of the invention will become apparent from the discussion below.

SUMMARY OF THE INVENTION

It has now been discovered that a unique fat mimetic system for prepared foods can be made from a combination of modified or unmodified starch, cellulose, protein, gum and flavoring. In order to obtain these unique properties, the relative quantities of the components of the mimetic system must be maintained within the very carefully delineated ranges discovered in the development of the invention and described below. The mimetic can be prepared by combining these components with water to achieve the desired consistency and then used in making the prepared foods. Alternatively, the mimetic effectively can be provided in situ, by introducing the above mimetic system components during the preparation of the prepared food product.

DETAILED DESCRIPTION OF THE INVENTION

Starch

The level of starch in the system ranges from about 10 to 85 percent by weight. In a preferred embodiment, the level of starch will be about 24–84 percent by weight.

The starch, which may be modified or unmodified, will be chosen from among corn starch, potato starch, rice starch, wheat starch, tapioca starch, tapioca dextrin and tapioca maltodextrin. The preferred starches are tapioca dextrin and modified corn starch.

Cellulose

Cellulose will be present in the system at a level of about 2–25 percent by weight and preferably at a level of about 4–21.5 percent by weight. The cellulose should be in powder form and have a particle size of about 5–100 microns. It is preferred that the cellulose powder particles be about 20 microns in size. The cellulose will be chosen from among cellulose, cellulose gel, and cellulose ether.

Protein

The protein will be present in the fat mimetic system at a level of about 4.0–70 percent by weight and preferably at a level of about 6.9–62.4 percent by weight. The protein may include whey, whey protein concentrate, milk, non-fat dry milk, casein, rice protein, pea protein, soya, egg albumin and gelatin. Preferably, the protein will be a milk derivative.

Gum

The level of gum in the system will range from 0 to about 4 percent by weight. In a preferred embodiment, about 1–2 percent by weight gum will be present. The following gums may be used: guar, carrageenan, gum arabic, xanthan, alginate, methocel, and karaya.

Flavoring

Flavoring may be added to the system at a level of up to about 8.2 percent by weight. The use of flavoring is optional and will depend on the type of prepared foodstuff in which the fat mimetic system is to be used. Typical useful flavorings may be chosen from among: cream flavor, butter flavor, cheese flavor, chicken flavor and beef flavor.

Preparation of the Fat Mimetic System

In one embodiment of the invention, the fat mimetic system is prepared before being used in the prepared foodstuff. In this embodiment, the starch, cellulose, protein, optional gum and optional flavor are dispersed in water at about 50°–90° C. and agitated. The level of water and the rate and time of agitation will depend upon the consistency sought in the resulting mimetic product, which preferably will be a thickened, smooth and creamy consistency having the mouthfeel and appearance of a plastic shortening. Usually, in order to achieve such a product, the above ingredients will be combined with water at a ratio, on a weight basis, of dry ingredients to water of about 1:5 and preferably about 1:3.

In another embodiment of the invention, the fat mimetic system components are not separately combined with water but rather are added directly to the prepared foodstuff to achieve the desired fat mimetic result in situ. Also, when the preparation of the prepared foodstuff does not include a boiling step, an instant starch like instantized tapioca dextrin should be used.

The practice of the invention will be illustrated in the following examples in which all percentages are by weight, unless otherwise indicated.

EXAMPLES

EXAMPLE I

In this example, a fat mimetic system having a paste-like consistency was prepared by first dry blending the following:

| Ingredients | % by weight |
|---|---|
| modified potato starch | 84.0 |
| cellulose (20 micron particle size) | 7.6 |
| whey | 7.6 |
| butter and cream flavoring | 0.8 |

Then, water at about 82°–88° C. was added to the blended dry ingredients and the mixture stirred for about 10–20 minutes at 230 rpm on a Stir-Pak Laboratory Mixer having a 0.5–1 inch blade to produce an end-product with a smooth and creamy consistency.

A low fat biscuit was then prepared from a conventional recipe in which 50 percent of the shortening was replaced by the above fat mimetic system. The biscuit was prepared in a conventional fashion from the following ingredients:

| Ingredients | Weight (grams) |
|---|---|
| flour | 66.3 |
| leavening agent | 3.1 |
| shortening | 6.0 |
| emulsifer | 2.0 |
| salt | 2.0 |
| sugar | 1.5 |
| shortening flakes | 6.0 |
| fat mimetic system | 40.0 |
| buttermilk | 45.0 |

The resulting biscuit which, as noted, had about 50% less fat, also had about 51 percent less cholesterol and was nearly indistinguishable from its full-fat counterpart in taste and appearance.

Example II

In this example, reduced fat biscuits were again prepared, except that a dry blend of the fat mimetic system was added directly to the biscuit formulation. The desired fat texture formed when the biscuit was baked, to again produce a product nearly indistinguishable from its full-fat counterpart.

Example III

In this example, a reduced fat and low cholesterol cream soup was prepared. The fat mimetic system, which, as in Example II was added directly to the other prepared food ingredients, included the following:

| Ingredients | % by weight |
|---|---|
| tapioca dextrin | 69.8 |
| cellulose | 21.5 |
| whey | 6.9 |
| guar gum | 1.7 |
| dariy flavor | 0.1 |

The above fat mimetic ingredients were uniformly blended and then combined with conventional cream soup ingredients:

| Ingredients | Weight (grams) |
|---|---|
| flour | 26.17 |
| fat mimetic system | 32.49 |
| non Dairy Creamer | 15.00 |
| salt | 5.50 |
| sugar | 0.75 |
| spices | 1.09 |
| starch | 6.00 |
| sweet cream | 13.00 |
| water | 793.00 |

The ingredients were uniformly blended, heated to boiling and stirred for about 15 minutes.

The resulting cream soup had 54.7 percent less fat than its full fat (chicken fat) counterpart and the remaining fat was lower in saturated fat content. Cholesterol was reduced by 56.5%. The cream soup was found organoleptically indistinguishable from its full-fat counterpart by a test panel of 100 people.

Also, the dry ingredients (mimetic and soup combined) were stored at room temperature for six months, then subjected to sensory, analytical and microbial tests, and found to exhibit no appreciable changes. Freeze and thaw stability tests showed like positive results. These stability test results are far superior to those of full-fat counterparts which include chicken fat.

Example IV

A low fat and low cholesterol cheese sauce was prepared from a fat mimetic system comprising:

| Ingredients | % by weight |
|---|---|
| modified corn starch (instantized) | 60.0 |
| cellulose | 4.0 |
| protein | 29.4 |
| carrageenan gum | 1.0 |
| cheese flavor | 4.6 |

The above ingredients were combined with the following conventional cheese sauce ingredients, to which the hot water was added followed by stirring:

| Ingredients | Weight (grams) |
|---|---|
| reduced fat cheese | 36 |
| fat Mimetic system | 50 |
| shortening | 5 |
| salt | 4 |
| sugar | 4 |
| emulsifier | 1 |
| water (82–88° C.) | 236 |

The resulting cheese sauce had 51.4 percent less fat and 25.9 less cholesterol than its full-fat counterpart. Also, it was indistinguishable from its full fat counterpart.

Example V

A low fat and low cholesterol alfredo sauce was prepared from a fat mimetic system comprising:

| Ingredients | % by weight |
|---|---|
| modified corn starch | 67.7 |
| cellulose | 15.3 |
| whey and milk | 10.6 |
| cheese flavor | 6.4 |

The above fat mimetic ingredients were combined with the following conventional alfredo sauce ingredients after which they were heated to boiling and stirred as in Example III:

| Ingredients | Weight (grams) |
|---|---|
| cheese | 30.6 |
| fat mimetic system | 35.9 |
| non dairy creamer | 15.5 |
| salt | 7.0 |
| sugar | 2.0 |
| cream | 9.0 |
| water | 94.0 |

The resulting alfredo sauce, which was indistinguishable from its full-fat counterpart, had 32.6 percent less fat and 26.2 less cholesterol. Also, it was found to be freeze and thaw stable and to withstand retorting with no perceptible loss of flavor or other organoleptic properties.

Example VI

A low fat and low cholesterol cream sauce was prepared using the following fat mimetic system:

| Ingredients | % by weight |
|---|---|
| tapioca dextrin (instantized) | 24.0 |
| cellulose | 5.2 |
| whey and non-fat dry milk | 62.4 |
| guar gum | 0.2 |
| cheese flavor | 8.2 |

The above fat mimetic ingredients were combined with conventional cream sauce ingredients as follows:

| Ingredients | Weight (grams) |
|---|---|
| fat mimetic system | 57.4 |
| starch | 26.9 |
| salt | 5.4 |
| spices | 1.0 |
| emulsifier | 9.3 |
| water (82–88° C.) | 556.6 |

The resulting cream sauce, which was indistinguishable from its full-fat counterpart, had 28.8 percent less fat and 50 percent less cholesterol.

Example VII

A low fat and low cholesterol chicken gravy was prepared using a fat mimetic system comprising:

| Ingredients | % by weight |
|---|---|
| modified corn starch (instantized) | 34.2 |
| cellulose | 12.1 |
| whey and non-fat dry milk | 47.6 |
| guar gum | 0.5 |
| chicken flavor | 5.6 |

The above fat mimetic ingredients were combined in the following conventional chicken gravy recipe:

| Ingredients | Weight (grams) |
|---|---|
| fat mimetic system | 41.2 |
| starch | 29.6 |
| salt | 3.0 |
| sugar | 2.0 |
| spices | 14.7 |
| chicken powder | 11.5 |
| water (82–88° C.) | 513.0 |

The resulting chicken gravy was indistinguishable from its full fat counterpart and had 58.8 percent less fat and 47.5 percent less cholesterol.

Example VIII

A country gravy was prepared and cooked up as in Example III using the following fat mimetic system:

| Ingredients | % by weight |
|---|---|
| tapioca dextrin (instantized) | 26.0 |
| cellulose | 10.5 |
| whey and non-fat dry milk | 62.2 |
| guar gum | 1.3 |

The above fat mimetic ingredients were combined in the following conventional country gravy recipe:

| Ingredients | Weight (grams) |
|---|---|
| fat mimetic system | 38.4 |
| sugar | 3.6 |
| salt | 3.0 |
| spices | 7.4 |
| flour | 29.6 |
| emulsifier | 18.0 |
| water | 514.0 |

The resulting country gravy, which was indistinguishable from its full fat counterpart, had 50.2 percent less fat and 61.1 percent less cholesterol.

The embodiments and examples described above are for illustrative purposes only and various modifications or changes therein will be apparent to persons skilled in the art and are intended to be included within the invention and the scope of the appended claims.

What is claimed is:

1. A fat-free composition for use as a mimetic said composition consisting essentially of:
   about 10–85 percent by weight starch;
   about 2–25 percent by weight cellulose;
   about 4–70 percent by weight protein;
   about 0–4 percent by weight gum; and
   about 0–8.2 percent by weight flavoring.

2. The fat mimetic system of claim 1 in which the starch is present at a level of about 24–84 percent by weight.

3. The fat mimetic system of claim 1 in which the cellulose is present at a level of about 4–21.5 percent by weight.

4. The fat mimetic system of claim 1 in which the cellulose is in powder form and has a particle size from about 5–100 microns.

5. The fat mimetic system of claim 1 in which the cellulose is in powder form and has a particle size of about 20 microns.

6. The fat mimetic system of claim 1 in which the protein is present at a level of about 6.9–62.4 percent by weight.

7. The fat mimetic system of claim 1 in which the gum is present at a level from about 1–2 percent by weight.

8. The fat mimetic system of claim 1 in which the starch is chosen from the group consisting of corn starch, modified corn starch, potato starch, modified potato starch, rice starch, modified rice starch, wheat starch, modified wheat starch, tapioca starch, modified tapioca starch, tapioca dextrin, modified tapioca dextrin, tapioca maltodextrin and modified tapioca maltodextrin.

9. The fat mimetic of claim 1 in which the starch is tapioca dextrin or modified corn starch.

10. The fat mimetic system of claim 1 in which the protein is chosen from the group consisting of whey, whey protein concentrate, milk, non-fat dry milk, casein, rice protein, pea protein, soya, egg albumin and gelatin.

11. The fat mimetic system of claim 1 in which the cellulose is chosen from the group consisting of cellulose, cellulose gel and cellulose ether.

12. The fat mimetic system of claim 1 in which the gum is chosen from the group consisting of guar, carrageenan, gum, arabic, xanthan, alginate, methocel and karaya.

13. The fat mimetic system of claim 1 in which the flavoring is chosen from the group consisting of: cream flavor, butter flavor, cheese flavor, chicken flavor and beef flavor.

14. The fat mimetic composition of claim 1 including sufficient water to produce a composition with a smooth and creamy consistency.

15. A reduced fat biscuit comprising a biscuit prepared from a conventional biscuit recipe in which the fat in the recipe is replaced with a fat-free mimetic system consisting essentially of:

about 24–84 percent by weight starch;

about 4–21.5 percent by weight cellulose;

about 6.9–62.4 percent by weight protein;

about 0–1.7 percent by weight gum; and about 0–8.2 percent by weight flavoring.

16. A reduced fat cream soup comprising a cream soup prepared from a conventional cream soup recipe in which the fat in the recipe is replaced with a fat-free mimetic system said mimetic system consisting essentially of:

about 24–84 percent by weight starch;

about 4–21.5 percent by weight cellulose;

about 6.9–62.4 percent by weight protein;

about 0–1.7 percent by weight gum; and about 0–8.2 percent by weight flavoring.

17. A reduced fat cheese sauce comprising a cheese sauce prepared from a conventional cheese sauce recipe in which the fat in the recipe is replaced with a fat-free mimetic system consisting essentially of:

about 24–84 percent by weight starch;

about 4–21.5 percent by weight cellulose;

about 6.9–62.4 percent by weight protein;

about 0–1.7 percent by weight gum; and about 0–8.2 percent by weight flavoring.

18. A reduced fat cream sauce comprising a cream sauce prepared from a conventional cream sauce recipe in which the fat in the recipe is replaced with a fat-free mimetic system consisting essentially of:

about 24–84 percent by weight starch;

about 4–21.5 percent by weight cellulose;

about 6.9–62.4 percent by weight protein;

about 0–1.7 percent by weight gum; and about 0–8.2 percent by weight flavoring.

19. A reduced fat chicken gravy comprising a chicken gravy prepared from a conventional chicken gravy recipe in which the fat in the recipe is replaced with a fat-free mimetic system consisting essentially of:

about 24–84 percent by weight starch;

about 4–21.5 percent by weight cellulose;

about 6.9–62.4 percent by weight protein;

about 0–1.7 percent by weight gum; and about 0–8.2 percent by weight flavoring.

20. A method for preparing a foodstuff comprising replacing at least a portion of the fat in the foodstuff with a fat-free mimetic said mimetic consisting essentially of the following dry components:

about 24–84 percent by weight starch;

about 4–21.5 percent by weight cellulose;

about 6.9–62.4 percent by weight protein;

about 0–1.7 percent by weight gum; and about 0–8.2 percent by weight flavoring.

21. A foodstuff made by the process of claim 20.

22. A method for preparing a foodstuff comprising replacing at least a portion of the fat in the foodstuff with the following fat-free mimetic:

about 24–84 percent by weight starch;

about 4–21.5 percent by weight cellulose;

about 6.9–62.4 percent by weight protein;

about 0–1.7 percent by weight gum; and about 0–8.2 percent by weight flavoring.

23. A foodstuff made by the process of claim 21.

\* \* \* \* \*

UNITED STATES PATENT AND TRADEMARK OFFICE
CERTIFICATE OF CORRECTION

PATENT NO. : 5,589,215
DATED : December 31, 1996
INVENTOR(S) : Pamela S. Tang

It is certified that error appears in the above-indentified patent and that said Letters Patent is hereby corrected as shown below:

Column 3, Line 55, change "dariy flavor" to --dairy flavor--

Column 4, Line 53, change "25.9 less cholesterol" to --25.9 percent less cholesterol--

Column 5, Line 18, change "26.2 less" to --26.2 percent less--

Column 8, Line 50, change "claim 21" to "claim 22"

Signed and Sealed this

Twenty-fourth Day of March, 1998

Attest:

BRUCE LEHMAN

*Attesting Officer*     *Commissioner of Patents and Trademarks*